United States Patent [19]

Milbury

[11] Patent Number: 5,509,259
[45] Date of Patent: Apr. 23, 1996

[54] LAWN DEBRIS RAKE AND COLLECTION DEVICE

[76] Inventor: Thomas Milbury, 26 Carolina Dr., New City, N.Y. 10956

[21] Appl. No.: 293,025

[22] Filed: Aug. 19, 1994

[51] Int. Cl.⁶ ............................. A01D 7/04; A01D 7/06
[52] U.S. Cl. .................... 56/400.04; 56/400.14; 56/400.16; 56/400.21
[58] Field of Search ............ 56/400.04, 400.06, 56/400.14, 400.16, 400.20, 400.21, 396

[56] References Cited

U.S. PATENT DOCUMENTS

| | | | |
|---|---|---|---|
| 514,017 | 2/1894 | Myers . | |
| 1,768,080 | 6/1930 | Kurihara . | |
| 2,033,451 | 3/1936 | Rose | 56/400.14 X |
| 2,329,708 | 9/1943 | Fetterman | 56/400.14 |
| 2,706,375 | 4/1955 | McLaughlin | 56/400.14 |
| 3,070,945 | 1/1963 | Uglem | 56/400.14 |
| 3,264,810 | 8/1966 | Lowell | 56/400.16 |
| 3,308,612 | 3/1967 | Oblinger | 56/400.20 X |
| 3,952,490 | 4/1976 | Brockman | 56/400.14 |
| 4,009,560 | 3/1977 | Wells | 56/400.14 |
| 4,516,393 | 5/1985 | Lambert | 56/400.17 |
| 4,821,500 | 4/1989 | MacIvergan | 56/400.14 |
| 5,003,760 | 4/1991 | Webb | 56/400.06 |
| 5,054,278 | 10/1991 | Thorndike | 56/400.14 |
| 5,058,370 | 10/1991 | Russell | 56/400.12 |
| 5,069,026 | 12/1991 | Johnson | 56/400.11 |
| 5,099,638 | 3/1992 | Bass | 56/400.16 |
| 5,142,855 | 9/1992 | Guidarelli | 56/400.16 |
| 5,177,946 | 1/1993 | Dietz | 56/400.16 |
| 5,177,947 | 1/1993 | Sun | 56/400.17 |
| 5,182,899 | 2/1993 | Sun | 56/400.17 |

Primary Examiner—George A. Suchfield
Attorney, Agent, or Firm—Furgang & Milde

[57] ABSTRACT

An array of tines are carried by a frame assembly so that the tines of the tine array are spaced one from the other across the assembly and so that ends of alternate tines form two rows of tine ends. The frame assembly is made of hollow pipe rods connected together by elbows, pipe, connectors and "T"s and so that one end of each tine is lodged in a first rod and the tines extend through a second rod. A bias rod extends across the tines and is spring urged against the tines proximate free ends thereof. Prongs, either separately formed, or extensions of the tines extend out from the frame assembly in a direction opposite to that of the tines. A removable push handle is pivotally carried by the frame assembly for movement between a first or raking disposition and a second or collection disposition. The push handle, when removed, is disposable on the frame which may thereafter be carried by a carry handle also secured to the frame assembly.

29 Claims, 6 Drawing Sheets

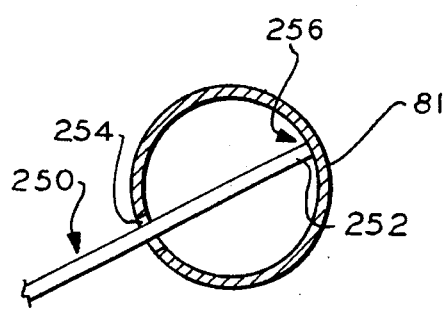
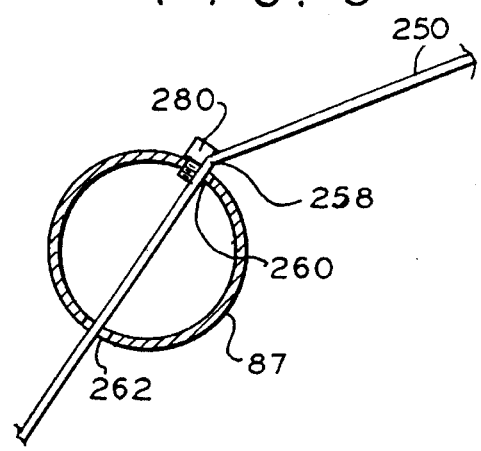
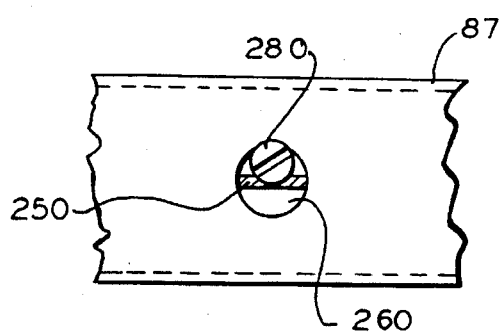
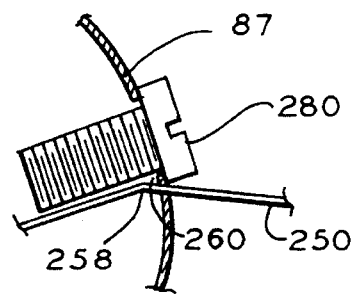
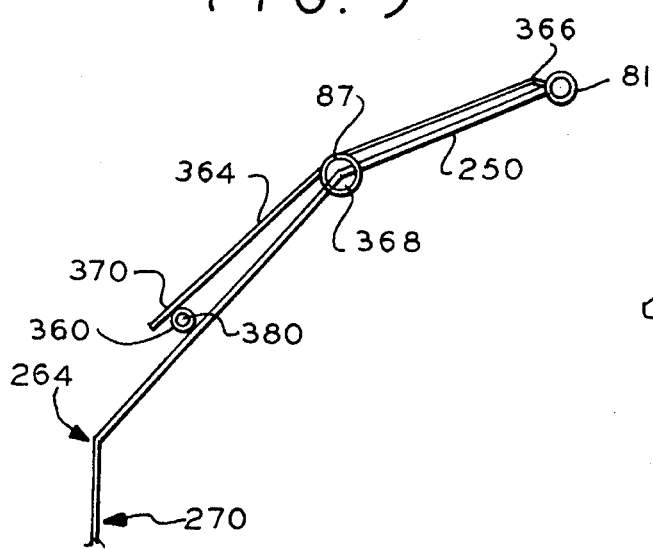
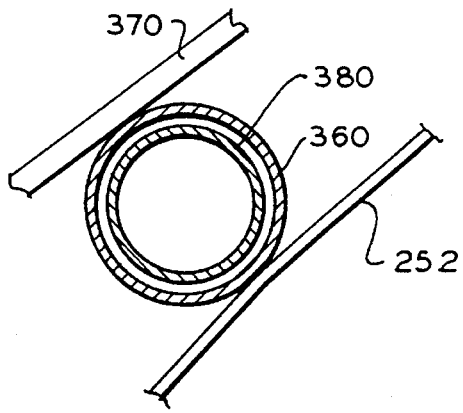

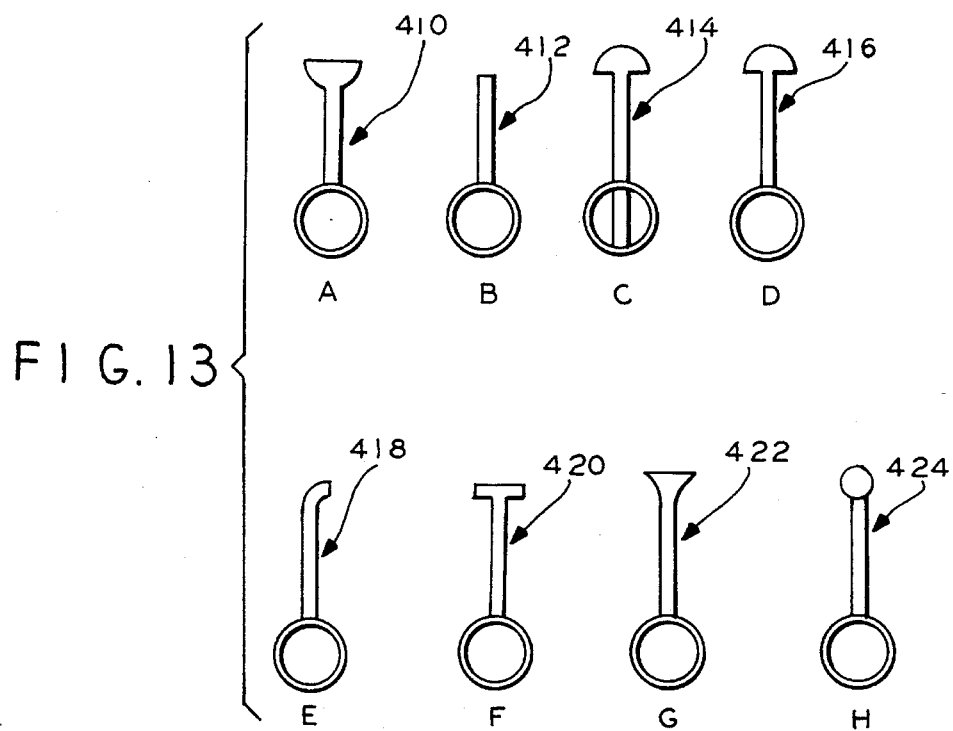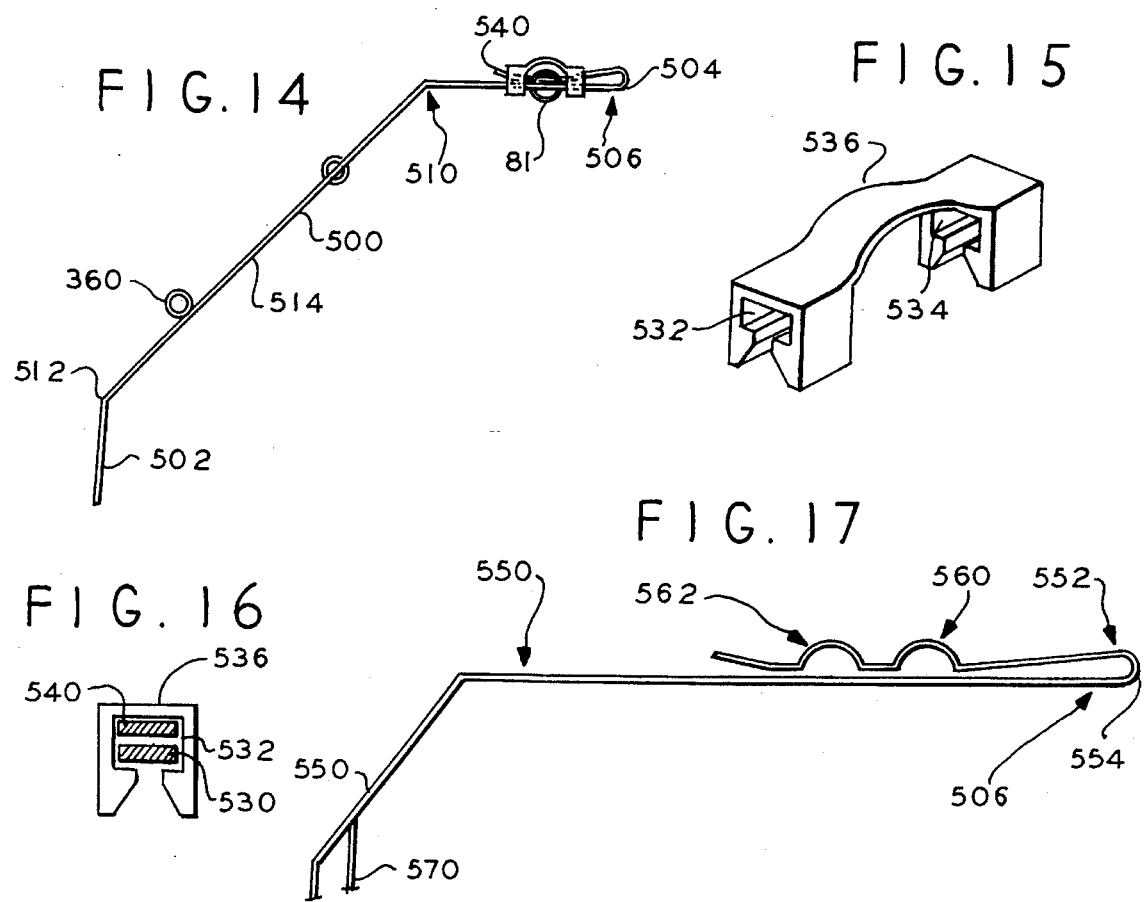

LAWN DEBRIS RAKE AND COLLECTION DEVICE

BACKGROUND OF THE INVENTION—FIELD OF APPLICATION

This invention relates to lawn care devices and, more particularly, to devices for removing leaves, pine cones, twigs and other debris from lawns.

BACKGROUND OF THE INVENTION—DESCRIPTION OF THE PRIOR ART

Hand raking of lawns, to remove leaves, twigs, pine cones and other debris has been, and is quite often, accomplished by a lawn rake of the types shown and described in U.S. Pat. No. 5,177,947 patented on Jan. 12, 1993 to H. C. Sun et al for "Rake", and in U.S. Pat. No. 5,182,899 patented on Feb. 2, 1993 to H. C. Sun et al for "Rake Connection Assembly". Such hand rakes are grasped by both hands of the user, one hand to apply a downward force to press the rake against the ground and a pulling force to draw the rake's tines and lawn debris toward the user; and the other hand to act as a fulcrum to facilitate the raking action. However hand raking with such "fan-type rakes" is relatively difficult and relatively slow, backbreaking work. The tines of such "fan-type" rakes are also quite susceptible to bending and breaking due to the forces applied during such uses; especially the centrally disposed tines which will usually have the most force applied thereto when the rake is in use.

The size and configuration of such "fan-type" rakes must also be limited to enable user use and by doing so the amount of lawn debris that can be moved with each stroke is also significantly limited. The incorporation of debris collection attachments with such "fan-type" rakes, as shown and described in U.S. Pat. No. 5,058,370 patented on Oct. 22, 1991 to E. M. K. Russell for "Yard Rake With Pick-Up Head" and in U.S. Pat. No. 5,069,026 patented on Dec. 3, 1991 to R. J. Johnson for "Push- Pull Rake", merely provides a convenient debris pick up facility but still does not provide for a very efficient use of the raking and debris collection efforts required by such rakes.

Providing such hand rakes with multiple rows or sets of tines, as shown and described in U.S. Pat. No. 5,099,638 patented on Mar. 31, 1992 to M. C. Bass for "Tri-Blade Yard Rake", in U.S. Pat. No. 5,142,855 patented on Sep. 1, 1992 to J. A. Guidarelli for "Push Or Pull Leaf Rake" and in U.S. Pat. No. 5,177,946 patented on Jan. 12, 1993 to W. A. Dietz Jr. for "Rake", still requires similar, human applied, forces to rake the lawn. The displacement of the tines in spaced rows as shown in the Dietz and Bass patents and the disposition and configuration of such tines so that raking can be accomplished by pushing or pulling the rake as shown by Guidarelli does not appear to readily alleviate the human efforts required to utilize such rakes.

In recent years leaf blowers have come into use to remove leaves and other debris from lawns. However, whether such blowers are hand-held, back-mounted, or wheeled they are still noisy, relatively dangerous, gasoline using, polluting, mechanical devices subject to breakdowns and with relatively limited lives.

An alternative approach to lawn raking may be accomplished by wheeled devices such as those shown an described in U.S. Pat. No. 514,017 patented on Feb. 9, 1894 to J. L. Myers for "wheeled Hand Rake", in U.S. Pat. No. 2,706,375 patented on Apr. 19, 1955 to G. P. McLaughlin for "Lawn Rake", and in U.S. Pat. No. 2,329,708 patented on Sep. 21, 1943 to O. B. Fetterman for "Push Rake". All of these devices require a mounting for their tines permitting rotation thereof for passage of the rake over a pile of debris. As such the effectiveness of the tines during raking may be affected in an unfavorable way. U.S. Pat. No. 1,768,080 patented on Jun. 24, 1930 to Y. Kurihara for "Lawn Rake" and U.S. Pat. No. 3,070,945 patented on Jan. 1, 1963 to A. S. Uglem for "Attachment For Rakes" both show tine arrangements for wheeled lawn rakes but do so for rakes which have only a single lawn raking use disposition.

Lawn raking devices, such as those shown and described in U.S. Pat. No. 4,009,560 patented on Mar. 1, 1977 to E. H. Wells for a "Wheeled Raking Device" and in U.S. Pat. No. 4,516,393 patented on May 14, 1985 to P. E. Lambert for "Wheeled Push Rakes", utilize cam and cam followers and stored spring energy respectively to provide moving rake actions. In doing so, in an environment of dirt and debris, they inherently create devices which may suffer mechanical breakdowns rendering the devices unavailable for their intended uses. Alternatively, U.S. Pat. No. 4,821,500 patented on Apr. 18, 1989 to R. G. MacIvergan for "Raking Means", shows and describes a wheeled raking device that requires two sets of separately disposed tines; one set for gathering lawn debris and the other set for keeping gathered debris in front of the gathering tines.

SUMMARY OF THE INVENTION

It is therefore an object of this invention to provide new and improved lawn rakes.

It is another object of this invention to provide new and improved lawn debris raking and collection devices.

It is yet another object of this invention to provide new and improved wheeled lawn debris raking and collection devices.

It is still another object of this invention to provide new and improved multiple use, multiple disposition lawn raking and debris collection devices.

It is yet still another object of this invention to provide new and improved, hand portable, wheeled, lawn raking and lawn debris collection devices.

It is yet a further object of this invention to provide new and improved, wheeled lawn rakes with individually replaceable tines.

It is still a further object of this invention to provide new and improved wheeled lawn rake constructions which provide for strength, rigidity and relatively light weight.

It is yet still a further object of this invention to provide lawn debris raking devices which provide for alternative raking members.

It is yet still a further object of this invention to provide lawn debris raking and collecting devices which in a first disposition bulk rakes the lawn debris and in a second disposition bulk pushes the lawn debris.

Other objects, features, and advantages of the invention in its details of construction and arrangement of parts will be seen from the above and from the following description of the preferred embodiments when considered with the drawing and from the appended claims.

BRIEF DESCRIPTION OF THE DRAWING

In the drawing:

FIG. 5 is a partial sectional view of a portion of the tine mounting structure showing one end of a tine mounted therein and enlarged to better show details thereof;

FIG. 6 is a partial sectional view of another portion of the tine mounting structure showing an intermediate section of the tine of FIG. 5 mounted therein and enlarged to better show details thereof;

FIG. 7 is a showing of the securing member for the tine and mounting structure of FIG. 6;

FIG. 8 is a side sectional view of a portion of the securing member and mounting structure of FIG. 7 enlarged to better show details thereof;

FIG. 9 is a schematic side view of the tine of FIGS. 5–8 showing same mounted to the tine assembly structure and in cooperation with a tine biasing device;

FIG. 10 is a partial sectional view of another portion of the tine of FIGS. 5–9 showing same disposed for coaction with a portion of the tine biasing device and enlarged to better show the details thereof;

FIGS. 13A–H show alternative configurations for raking prongs usable with the device of FIGS. 1 and 2;

FIG. 14 is a schematic elevation showing of an alternative tine and prong construction and associated mounting structure usable with the device of FIGS. 1 and 2;

FIG. 15 is a schematic of the tine retaining clip of FIG. 14 enlarged to better show details thereof;

FIG. 16 is an end view of the tine returning clip of FIGS. 14 and 15 showing a section of the tine of FIG. 14 in coaction therewith;

FIG. 17 is a side view of another tine construction showing a single tine configured for two possible mountings with the tine mounting structure of FIGS. 14–15;

DESCRIPTION OF THE PREFERRED EMBODIMENTS

Figure 1:
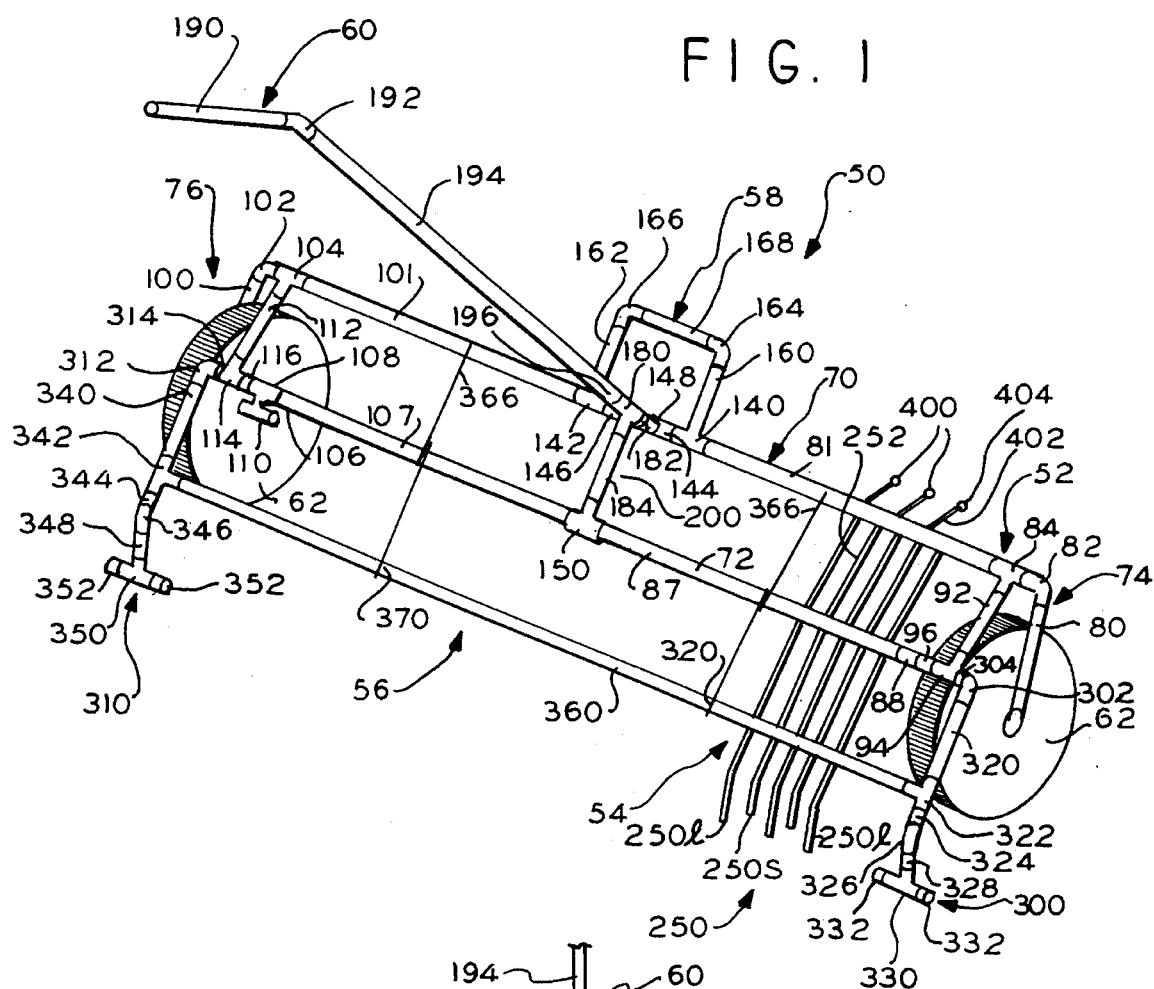
FIG. 1 is a perspective schematic of a lawn debris rake and debris-collection device incorporating the instant invention and showing the device in its raking disposition.
Figure 2:
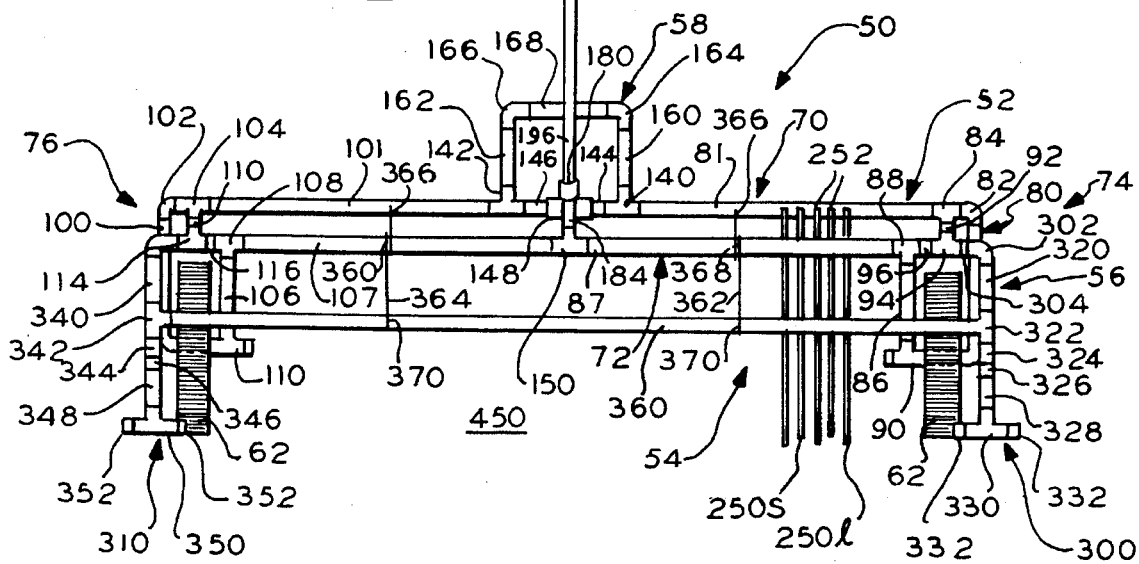
FIG. 2 is a rear elevation view of the device of FIG. 1, showing the device in its raking disposition.

With reference to FIG. 1 and 2 there is generally shown at 50 a lawn rake and debris-collection device including a frame assembly 52 mounting a tine array 54, a foot rest and tine bias assembly 56, a carry handle assembly 58 and a push handle assembly 60. A pair of wheels 62, rotatively carried by frame assembly 52, facilitate rolling movement of lawn device 50.

Figure 3:
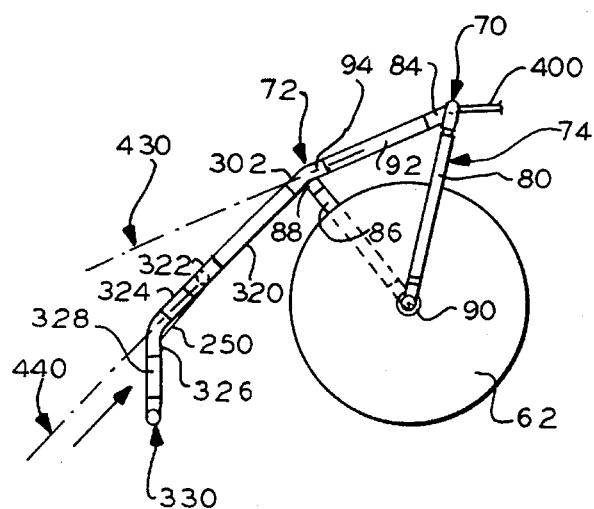
FIG. 3 is a side elevation view of the device of FIGS. 1 and 2 showing components of same proximate the right end thereof.
Figure 4:
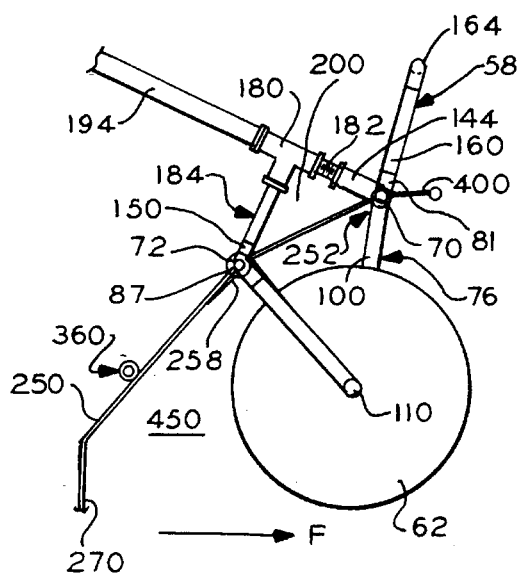
FIG. 4 is a vertical section view of the device of FIGS. 1 and 2 showing components of same proximate the carry handle and push handle thereof.

A pair of longitudinally extending frame rod assemblies 70, 72 (FIGS. 1–4) are connected together in spaced relationship, as shown in the figures, by a first end support 74 (FIGS. 1–3) disposed proximate right ends thereof and a second end support 76 (FIGS. 1, 2 and 4) disposed proximate left ends thereof. End support 74 includes a first short rod 80 (FIGS. 1 and 2) connected at a first end to a cross-rod 81 of rod assembly 70 at an elbow 82 and a "T" 84 and a second short rod 86 (FIG. 2) connected at a first end to a cross-rod 87 of rod assembly 72 at a "T" 88. A cross-piece 90 connects the second ends of short rods 80, 86 together and rotatively mounts wheel 62. A bearing (not shown) may be carried by cross-piece 90 to facilitate rotation of wheel 62. A spacer rod 92 extends from "T" 84 to a "T" 94 secured by a connector piece 96 to "T" 88 to further stabilize and rigidize frame assembly 52 proximate its right end. End support 76 also includes a first short rod 100 connected at a first end to a cross-rod 101 of rod assembly 70 at an elbow 102 and a "T" 104 and a second short rod 106 (FIGS. 1 and 2) connected at a first end to a cross-rod 107 of rod assembly 72 at a "T" 108. A cross-piece 110 connects the second ends of short rods 100, 106 together and rotatively mounts wheel 62. A bearing (not shown) may be carried by cross-piece 110 to facilitate rotating of wheel 62. A spacer rod 112 extends from "T" 104 to a "T" 114 secured by a connector piece 116 to "T" 108 to further stabilize and rigidize frame assembly 52 proximate its left end.

Cross-rods 81 and 101 of frame rod assembly 70 are connected together by a pair of "T"s 140, 142, a pair of connector pieces 144, 146 and a center "T" 148; while cross-rods 87 and 107 of frame rod assembly 72 are connected together by a center "T" 150. Carry handle pieces 160, 162 extend from "T"s 140, 142 respectively and are connected through elbows 164, 166 to a carry piece 168. A push handle receiving "T" 180 is connected by a connector piece 182 (FIG. 1) to "T" 144 and by a connector piece 184 to "T" 150. Push handle assembly 60 includes a hand grip 190 connected by an elbow 192 to a push rod 194 which is externally threaded at an end 196 to be received in internal threads formed in handle receiving "T" 180. Elbow 192 and "T"s 150, 180 and 144 as well as pieces 184, 182 are all disposed at appropriate angles so that push handle rod 194 and grip 190 are at an angular disposition and height to facilitate pushing device 50 as will be hereinafter described in greater detail.

All rods, cross-pieces, connector pieces, elbows and "T"S are, for example, standard copper or similar tubing soldered together to form frame assembly 52, carry handle 58 and push handle 60; except that "T" 180 together with "T" 144 and connector 182 might be cast pipe to be internally threaded to removably receive handle rod 194 which may be a pipe or a wooden handle.

The configuration of the parts is such that when handle rod 194 is unthreaded from handle "T" 180 handle assembly 60 may be inserted in a handle storage opening 200 (FIGS. 1 and 4) and on top of tine array 54 and cross-rods 92, 112.

Solid rods, hollow tubes of metal or other suitable material may be utilized for all or some of the rods, cross-pieces, connector pieces, elbow, "T"'s, etc; and such may be of circular or other suitable cross-section. In addition, these members may be assembled together by welding, brazing, soldering, or other utilizing processes as required.

Figure 11:
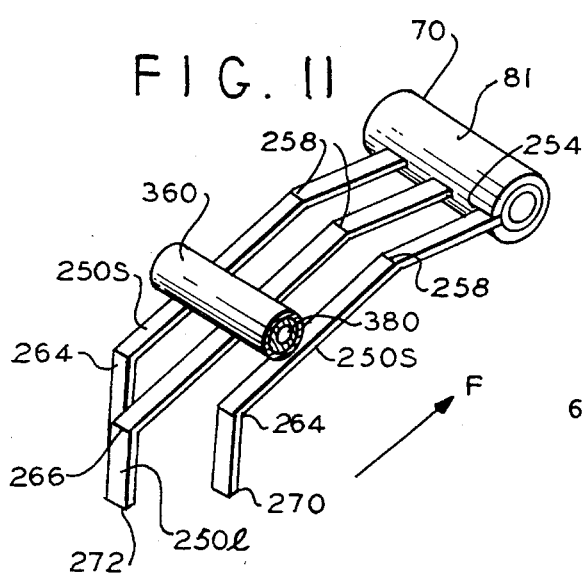
FIG. 11 is a perspective showing of a number of tines, such as that of FIGS. 5–10, with part of the tine mounting structure removed and enlarged to better show details thereof.

Tine array 54 includes a plurality of individually mounted tines 250 (FIGS. 1 and 2) arranged in two alternating sets of long tines 250x and short tines 250s. All tines 250 (FIG. 4), long 250x and short 250s, are formed from spring wire like metal stock to provide strength, resilience and springy stability. A first end 252 (FIGS. 1, 2 and 5) of each tine 250 extends through an opening 254, formed in both frame rod 81 and frame rod 101, and is lodged against an inner wall thereof as at 256 (FIG. 5). A first bend 258 (FIGS. 4 and 6) is formed in each tine 250 proximate where tine 250 enters a first opening 260 (FIGS. 6–8) formed in both frame rod 87 and frame rod 107. Each tine 250 then extends through a second opening 262 in the frame rod (87 or 107) up to a second bend formed in short tines 250s at 264 (FIG.11) and in long tines 250x at 266. Frame rod 87 has been omitted from FIG. 11 to better show details of tines 250; especially bends 258 thereof. At the second bend each tine extends down a distance so that tips 270, 272 of tines 250s and 250x respectively are aligned in a same plane but in two parallel rows; a 270 row and a 272 row. If desired a securing member, such as a threaded member 280 (FIGS. 6–8) or the like, may be inserted in each opening 260 of the frame rod (87 or 107) above each tine 250 to jam and secure tines 250 in place. Alternatively, a wedge (not shown) may be used as a securing member in place of threaded member 280 to jam and secure tines 250 in place.

Foot rest and tine bias assembly 56 includes a first foot assembly 300 (FIGS. 1 and 2) pivotally connected by an elbow 302 and a connector 304 to a free end at "T" 94 at the right end of device 50 and a second foot assembly 310 pivotally connected by an elbow 312 and a connector 314 to a free end of "T" 114 at the left end of device 50. A rod part 320 extends from elbow 302 to one side of a "T" 322, another end of which is connected by a connector 324 to an elbow 326 and therefrom by another connector 328 to a "T" 330 which comprises the foot member of foot assembly 300. A pair of end caps 332 are lodged in open ends of "T" 330 to complete foot member 330. In similar manner, a rod part 340 extends from elbow 312 to one side of a "T" 342, another end of which is connected by a connector 344 to an elbow 346 and therefrom by another connector 348 to a "T" 350 which comprises the foot member of foot assembly 310. A pair of end caps 352 are lodged in open ends of "T" 350 to complete foot member 350.

A tine bias rod 360 extends between and is connected to the remaining free end of "T"s 322 and 342. A pair of springs 362, 364 (FIGS. 1, 2 and 9), each having a first end 366 connected to a frame rod 81 or 101 respectively in a manner similar to that for tines 250 and an intermediary part 368 wrapped around frame rods 87 and 107 respectively, each have their second free end 370 disposed against tine bias rod 360 to bias tine bias bar 360 and spring loaded tines 250 in the counterclockwise direction (FIG. 9) about frame rods 81, 101. That biasing action urges feet 330, 350 against the ground or other surface upon which device 50 may be disposed and tips 270, 272 of tines 250 towards that surface. The size of tips 270, 272 is selected so that they may not touch that surface but instead approach same and move over same when device 50 is being used to rake leaves and other debris off of such surface if there are any such leaves and debris thereon. The tips 270, 272 will contact and travel the surface when push handle 194 is pushed downwardly. If desired, a second tine biasing rod 380 (FIG. 10) may be disposed within rod 360 to strengthen rod 360; it being understood that the outer diameter of inner rod 380 would be selected to be less than the inner diameter of rod 360 for that purpose.

Figure 12:
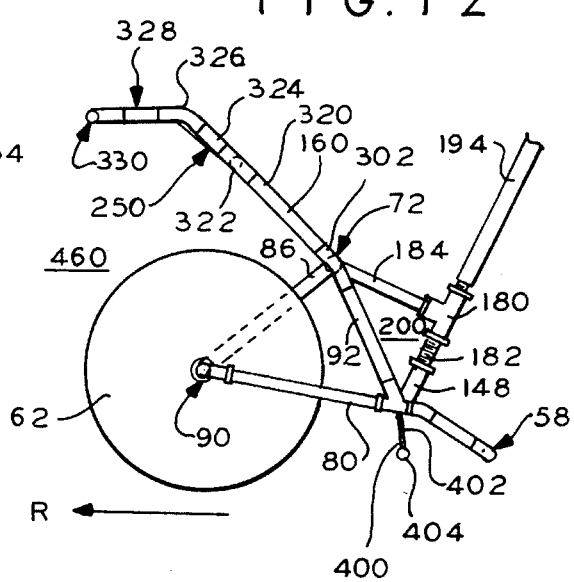
FIG. 12 is a side elevation view of the device of FIGS. 1 and 2 showing the device in its inverted or lawn debris pushing disposition.

A plurality of prongs 400 (FIGS. 1, 3, 4 and 12) extend horizontally out from frame rod 81 and frame rod 101 in a direction opposite to that of tines 250. Prongs 400 each include a stem 402 having a first end secured, by conventional means, to frame rod 81 for those prongs 400 carried by frame rod 81 and to frame rod 101 for those prongs 400 carried by frame rod 101; with each such prong 400 extending out from their frame rod 81 or 101 respectively, as shown in FIGS. 1 and 12, and terminating at a head 404. Prongs 400 also function to collect leaves and debris, but when device 50 is in its inverted or debris collection disposition (FIG. 12). While prongs 400 have been shown each with a stem 402 and a head 404 other constructions and configurations may be utilized as shown for prongs 410–424 of FIGS. 13 A–H respectively.

It should be noted that frame rods 81, 101 and 87, 107 together define a plane disposed along line 430 (FIG. 3) at a first predetermined angle to the horizontal and that frame rods 87, 107 and tine bias rod 360 define another plane disposed along a line 440 at a second predetermined angle which, for example, may be at 25 degrees from line 430. Rods 80, 100, on the other hand, occupy a plane at about 20 degrees to the vertical.

Lawn device 50, in use, is pushed by handle 194 to move device 50 in the direction of arrow F (FIGS. 4 and 11) so that tine tips 270, 272 rake up leaves and other debris that may be on the lawn; with tine tips 270 being on shorter and stiffer tines 250s so they rake up first and tine tips 272 being on longer and more flexible tines 250x following close behind. The size of the space 450 between wheel 62 and in front of tines 250 will permit a relatively large amount of debris to be raked up while device 50 is in its raking disposition. When the raked pile is to be removed when finished raking or to permit further raking, handle 194 and frame assembly 52 are rotated clockwise about the axis of rotation of wheels 62 from the raking disposition for device 50 (FIG. 4) to an inverted or pushing disposition therefore (FIG. 12). Movement of device 50 in the forward direction R (FIG. 12) traps and pushes leaves and debris in space 460 in front of tines 250. Handle 58 prevents prongs 400 from reaching the surface upon which device 50 is moving and spaces distal ends of prongs 400 above that surface thus permitting prongs 400 to push forward leaves and debris that might otherwise pass under frame rods 81, 101. When work with device 50 is finished, handle 194 may be unscrewed from "T" 180 stored in space 200 and device 50 carried away by handle assembly 58.

FIGS. 14–16 show a tine 500 of alternative construction and configuration with an alternative manner of attachment to frame assembly 52. Each tine 500, like tines 250, includes a free end 502 configured and disposed to rake leaves and other debris; and which may be configured long and short as for tines 250x and 250s. The other end of each tine 500 is bent over at 504 to form a prong 506 which will be disposed and serve the same purpose as prongs 400. A first bend is formed in each tine 500 at 510 and a second bend is formed in each tine 500 at 512; the portion 514 of tines 500 between bends 510 512 extending through the aligned openings of frame rods 87, 107 as shown for tines 250 and also lying under and co-acting with biasing rod 360 as shown and described for tines 250.

A section 530 of each tine 500, disposed between bend 510 and bent over end 504, extends through a suitable opening formed through frame rod 81, or frame rod 101, as well as through openings 532, 534 (FIGS. 15 and 16) of an attachment clip 536. The remaining free end 540 (FIGS. 14 and 16) of each tine 500 extends through opening 534 of tine clip 536 over frame rod 81 (or 101) and out through opening 532 of tine clip 536 (as schematically shown in FIG. 14) and is then bent under at 542 to prevent clip 536 from sliding off. Thus each tine 500 not only serves the purpose of tines 250 of device 50 but also that of prongs 400 thereof. If desired tine 500 between bend 510 and free end 540 may be formed to pass both under and over frame rod 81 and as such be attached to frame rod 81 by clip 536 or by a pair of single clips configured to attach on either side of frame rod 81 to attach tine 250 to frame rod 81.

FIG. 17 shows still another configuration of a combined tine and prong 550. An end section 552 of tine 550 is not only bent over at 554 to form a prong 504 but is provided with two curved portions 560, 562 each sized and configured to co-act with the frame rod (81, 101) to which tines 550 are to be connected. When tine end 552 is disposed for coaction with the frame rod, so that curved portion 560 is disposed over the frame rod, the other ends 570 of tines 550 will be disposed further forward then such ends 570 would be if curved portion 562 were disposed over the frame rod. A free end 580 of tines 550 is bent under at 582 after tines 550 have been assembled to their frame rods (81, 101) and clips, similar to clips 536 of FIGS. 15 and 16, have been applied thereto to keep such clips from sliding off.

Figure 18:
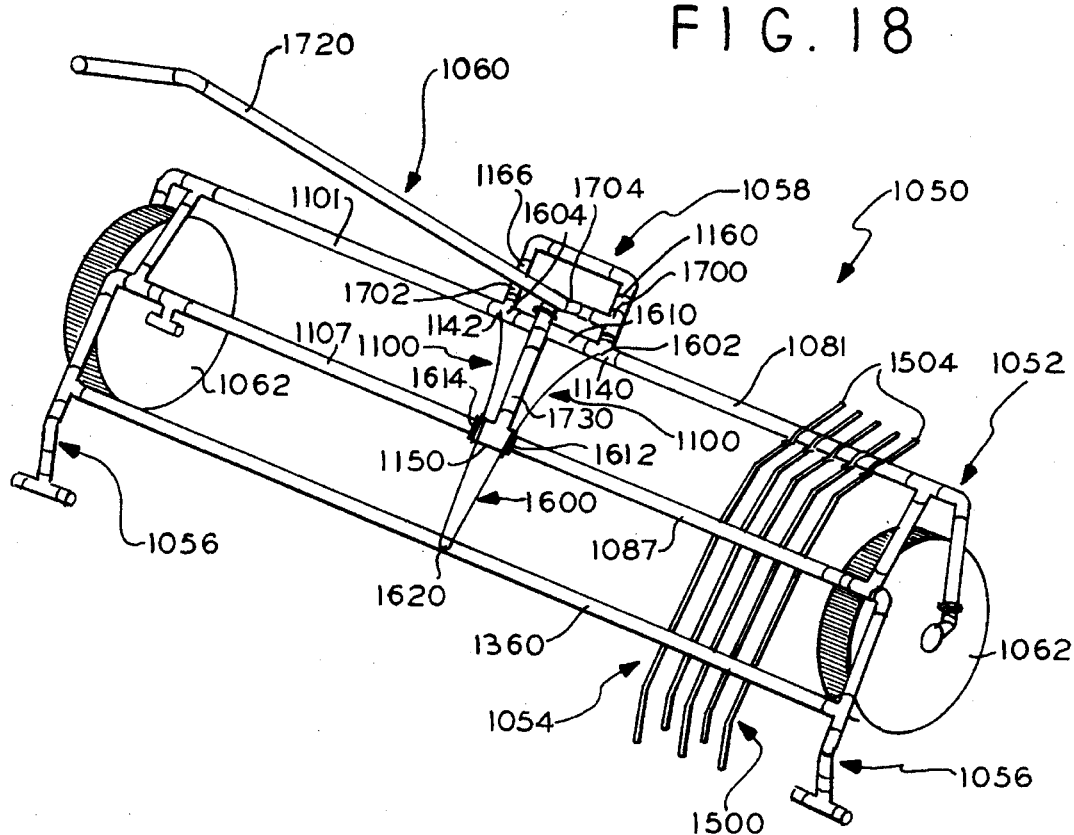
FIG. 18 is a perspective showing of an alternative lawn debris rake and collection device incorporating the instant invention and showing the device in its raking disposition.
Figure 19:
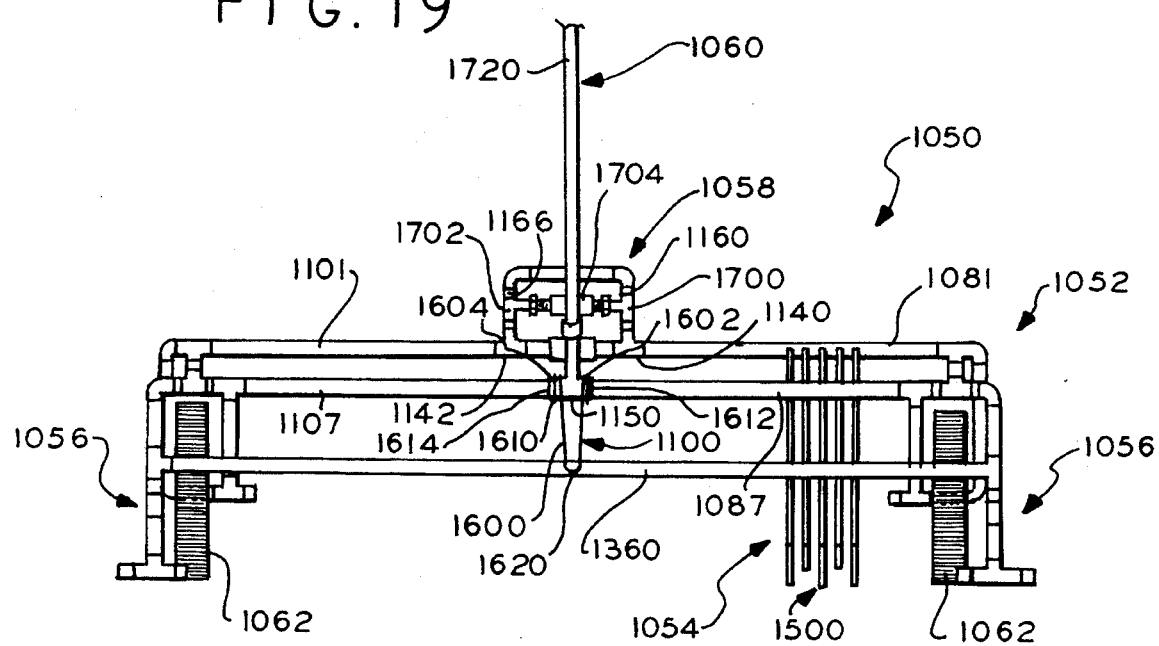
FIG. 19 is a rear elevation view of the device of FIG. 18 showing the device in its raking disposition.

With reference to FIGS. 18 and 19 there is generally shown at 1050 an alternative embodiment of lawn rake and debris-collection device incorporating the instant invention. Device 1050, is similar to device 50 in that it includes a frame assembly 1052 mounting a tine array 1054, a foot rest and tine bias assembly 1056, a carry handle assembly 1058 and a push handle assembly 1060 all mounted to roll on a pair of rotatively mounted wheels 1062.

Frame assembly 1052 of device 1050 is substantially identical in construction and configuration to frame assembly 52 of device 50 as it would be configured and constructed to mount tines 500 (FIG. 14). Similarly, foot rest and tine bias assembly 1056 is substantially identical in construction and configuration to foot rest and tine bias assembly 56 of device 50 except that an alternative bias spring arrangement 1100 is provided for assembly 1056. Carry handle assembly 1058 is somewhat modified when compared with carry handle assembly 58 of device 50 and the internally threaded receptacle for push handle assembly 1060 is somewhat modified from that for push handle assembly 60 of device 50. In all other respects these assemblies 1053, 1056, 1058 and 1060 are constructed from pipes, elbows, "T"s, connectors, parts, pieces and ends of similar size, type of construction and connection as used for device 50.

Figure 20:
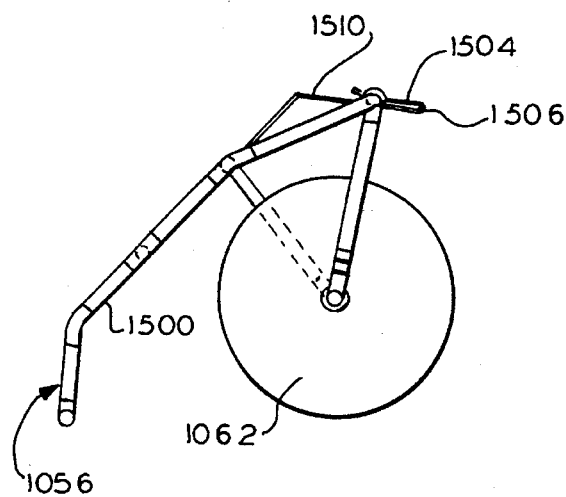
FIG. 20 is a side elevation view of the device of FIGS. 18 and 19 showing components of same proximate the right end, thereof.
Figure 21:
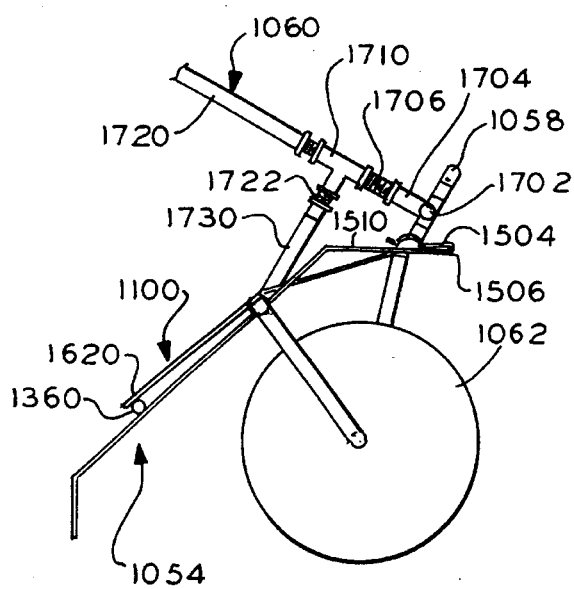
FIG. 21 is a vertical section view of the device of FIGS. 18 and 19 showing components of same proximate the carry handle and push handle thereof.
Figure 23:
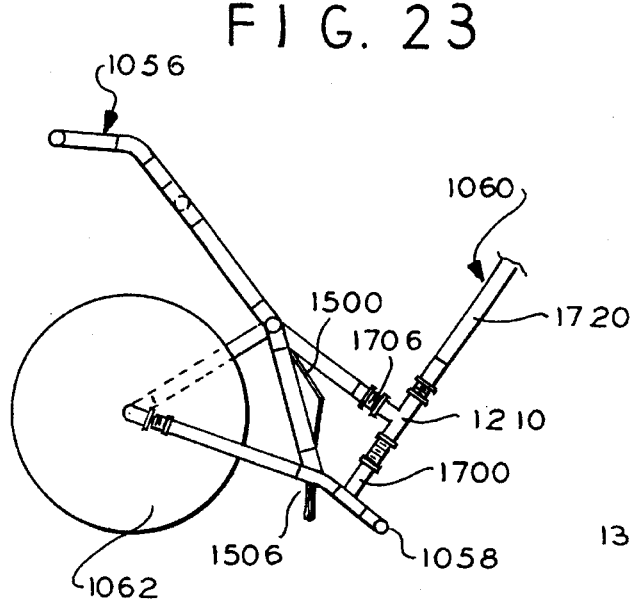
FIG. 23 is a side elevation view of the device of FIGS. 18–21 showing the device in its inverted or lawn debris pushing disposition.
Figure 22:
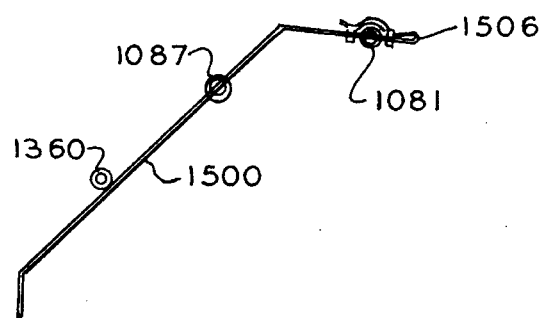
FIG. 22 is a schematic showing of the tine mounting structure for the device of FIGS. 19–21.

Tine array 1054 is fabricated and configured substantially similar to tines 500 of FIG. 14 and is secured to frame assembly 1052 and biased by tine bias assembly 1056 in substantially the same manner as described for FIG. 14. Ends 1504 (FIG. 18) of tines 1500 of tine array 1056 are connected to frame rods 1081, 1101 and form prongs 1506 in the same manner that ends 504 (FIG. 14) are connected to frame rods 81 and form prongs 506; except that portion 1510 of tines 1500 decline with respect to the horizontal when mounted to frame assembly 1052 as shown in FIG. 20 and 21.

Bias spring arrangement 1100 (FIGS. 18, 19 and 21) includes a spring 1600 with its respective ends 1602, 1604 secured to "T"s 1140 and 1142 of frame rods 1081, 1101 respectively; with a connector piece 1610 connecting "T"s 1140, 1142 together. Spring 1600 extends from its ends to be wrapped at 1612, 1614 around "T" 1150 that connects frame rods 1087 and 1107 together. A center section 1629 of spring 1600 is disposed over a bias rod 1360 to urge rod 1360 and foot rest and tine bias assembly 1056 clockwise about frame rods 1087, 1107 for purposes and as described for device 50.

"T"s 1700, 1702 are incorporated in handle parts 1160, 1166 of handle assembly 1058 and, in turn, mount there between a "T" 1704 internally threaded to receive a connector 1706 that, in turn, attaches to one end of a "T" 1710, another end of which removably receives a push handle 1720. Another connector 1722 extends from the remaining end of "T" 1710 and connects same to a rod part 1730 the other end of which is connected to "T" 1150.

Device 1050 functions the same as device 50 and can be carried by its handle assembly 1058 while its push handle 1060 is stored as for device 50.

While the invention has been described with preferred embodiments, it is not intended to limit the invention to the particular forms set forth, but, on the contrary, it is intended to cover such alternatives, modifications and equivalents as may be included within the spirit and scope of the invention as defined by the appended claims.

What is claimed is:

1. A lawn raking and debris-collecting device, comprising:

(a) a frame assembly;

(b) wheels carried by said frame assembly for rotation about a wheel axis;

(c) a tine array including a plurality of tines carried by said frame assembly so that free ends of said tines comprising said tine array are disposed for coaction with leaves and other lawn debris when the lawn device is in a raking disposition; and (d) a push handle assembly connected to said frame assembly to facilitate moving same frame assembly and said tine array in a predetermined direction while in said raking disposition;

(e) said push handle assembly being movable about a predetermined axis of rotation to move said frame assembly and said tine array into a debris collection disposition different from said raking disposition;

(f) said tines of said tine array being arranged in adjacent spaced but side-by-side disposition with each such tine secured to said frame assembly proximate a first end thereof and having a second end thereof freely disposed for coaction with lawn leaves and other debris; said second ends of a first plurality of said tines forming a first tine set and terminating along a first line, and said second ends of a second plurality of said tines forming a second tine set and terminating along a second line;

(g) said tines of said first tine set being alternately disposed with said tines of said second tine set.

2. The device of claim 1 wherein said tine array and frame assembly together form a leaf and debris collector and mover.

3. The device of claim 2 wherein said first line and said second line are spaced and parallel one with respect to the other.

4. The device of claim 1 including a plurality of prongs each having a first and secured to said frame assembly and a second end extending out from said frame assembly in a direction opposite to that of said tines of said tine array.

5. The device of claim 4 wherein each of said prongs of said plurality of prongs are spaced one from the other and all of said prongs are aligned in a row of prongs.

6. The device of claim 5 wherein said prongs each comprise an extension of a respective tine of said tine array.

7. The device of claim 6 wherein each such prong extension comprises a tine end folded over upon itself.

8. A lawn raking and debris-collection device, comprising:

(a) a frame assembly including a first frame rod sub-assembly and a second frame rod sub-assembly secured together in spaced relationship one with respect to the other;

(b) wheels carried by said frame assembly for rotation about a wheel axis;

(c) a tine array including a plurality of tines carried by said frame assembly so that free ends of said tines comprising said tine array are disposed for coaction with leaves and other lawn debris when the lawn device is in a raking disposition; and (d) said tines of said tine array being arranged in adjacent spaced but side-by-side disposition with each such tine secured to said first frame rod sub-assembly proximate a first end thereof and passing through said second frame rod sub-assembly and having a second end thereof freely disposed for coaction with lawn leaves and other debris; a first plurality of said tines forming a first tine set having second ends thereof terminating along a first line, and a second plurality of said tines forming a second tine set having second ends thereof terminating along a second line spaced from and parallel to said first line.

(e) a push handle assembly connected to said frame assembly to facilitate moving same frame assembly and said tine array in a predetermined direction while in said raking disposition;

(f) said push handle assembly being movable about a predetermined axis of rotation to move said frame assembly and said tine array into a debris collection disposition different from said raking disposition;

(g) said tine array and frame assembly together forming a leaf and debris collector and mover.

9. The device of claim 8 wherein threaded securing means secure each of said tines to said second frame rod sub-assembly.

10. The device of claim 9, wherein said frame assembly is fabricated from hollow piping secured together by components from the group consisting of pipe, elbows, connector and "T"'s.

11. The device of claim 10 including a tine biasing assembly disposed for coaction with each tine to urge each of said tines into said lawn raking disposition.

12. The device in claim 11 wherein said tine biasing assembly includes a first rod spanning a portion of each tine of said tine array and spring means urging said rod against said tines.

13. The device of claim 12 wherein said first rod is pivotally carried by said frame assembly and a second rod is disposed within said first rod to strengthen said first rod.

14. The device of claim 13 including at least one support foot carried by said tine biasing assembly.

15. The device of claim 13 including a pair of spaced support feet carried by said tine biasing assembly each one proximate an end of said tine biasing assembly.

16. A lawn raking and debris-collection device, comprising:

(a) a frame assembly;

(b) wheels carried by said frame assembly for rotation about a wheel axis;

(c) a tine array by said frame assembly so that free ends of the tines comprising said tine array are disposed for coaction with leaves and other lawn debris when the lawn device is in a raking disposition;

(d) a push handle assembly connected to said frame assembly to facilitate moving same frame assembly and said tine array in a predetermined direction while in said raking disposition;

(e) said push handle assembly being movable about a predetermined axis of rotation to move said frame assembly and said tine array into a debris collection disposition different from said taking disposition; and (f) a carry handle secured to said frame assembly proximate a central position thereof said carry handle serving as a foot in a leaf and debris collection disposition of said device.

17. The device of claim 16 wherein said push handle assembly is removably connected to said frame assembly and is otherwise positionable on said frame assembly.

18. A lawn raking and debris-collection device, comprising:

(a) a frame assembly;

(b) wheels carried by said frame assembly for rotation about a wheel axis;

(c) a tine array by said frame assembly so that free ends of the tines comprising said tine array are disposed for coaction with leaves and other lawn debris when the lawn device is in a raking disposition;

(d) a plurality of prongs each having a first end secured to said frame assembly and a second end extending out from said frame assembly in a direction opposite to that of said tines of said tine array;

(e) each of said prongs of said plurality of prongs being spaced one from the other and all of said prongs being aligned in a row of prongs;

(f) said prongs each comprising an extension of a respective tine of said tine array;

(g) each such prong extension comprising a tine end folded over upon itself;

(h) at least a part of each said prong extension wrapping around at least a part of said frame assembly; and (i) a push handle assembly connected to said frame assembly to facilitate moving same frame assembly and said tine array in a predetermined direction while in said raking disposition;

(j) said push handle assembly being movable about a predetermined axis of rotation to move said frame assembly and said tine array into a debris collection disposition different from said raking disposition.

19. The device of claim 18 including at least one attachment clip coacting with each prong extension to facilitate attachment of each of said tines to said frame assembly.

20. The device of claim 19 wherein at least a part of said prong extension extends through a part of said frame assembly and through said attachment clip and said attachment clip attaches to said frame assembly.

21. The device of claim 20 including a pair of attachment clips for attaching each of said tines to said frame assembly.

22. The device of claim 20 wherein said frame assembly is unitized.

23. The device of claim 22 wherein said frame assembly is unitized by welding.

24. A lawn raking and debris-collection device, comprising:
   (a) a frame assembly;
   (b) wheels carried by said frame assembly for rotation about a wheel axis;
   (c) a tine array carried by said frame assembly so that free ends of the tines comprising said tine array are disposed for coaction with leaves and other lawn debris when the lawn device is in a raking disposition;
   (d) a plurality of prongs each having a first end secured to said frame assembly and a second end extending out from said frame assembly in a direction opposite to that of said tines of said tine array;
   (e) each of said prongs of said plurality of prongs being spaced one from the other and all of said prongs being aligned in a row of prongs;
   (f) said prongs each comprising an extension of a representative tine of said tine array;
   (g) each such prong extension comprising a tine end folded over upon itself;
   (h) a first part of each such prong extension extending through a part of said frame assembly and a second part of each such prong extension wrapping around a part of said frame assembly; and
   (i) a push handle assembly connected to said frame assembly to facilitate moving same frame assembly and said tine array in a predetermined direction while in said raking disposition;
   (j) said push handle assembly being movable about a predetermined axis of rotation to move said frame assembly and said tine array into a debris collection disposition different from said raking disposition.

25. A lawn raking and debris-collection device, comprising:
   (a) a frame assembly including a plurality of hollow pipe members secured together by components from the group consisting of pipe, elbows, connectors and "T"'s;
   (b) wheels carried by said frame for rotation about a wheel axis;
   (c) a tine array carried by said frame assembly so that free ends of the tines comprising said tine array are disposed for coaction with leaves and other lawn debris when the lawn device is in use;
   (d) a handle assembly connected to said frame assembly to facilitate moving said frame assembly and said tine array in predetermined directions; and
   (e) a tine bias assembly pivotally carried by said frame assembly and urging said tines of said tine assembly into a predetermined disposition;
   (f) said tine bias assembly including a hollow rod spanning said tine array and pivotally connected to said frame assembly by other components from said group consisting of hollow rods, pipes, elbows and "T"'s.

26. The device of claim 25 including at least one spring attached at one end to said frame assembly and having its other end disposed against said hollow rod spanning said tine array.

27. The device of claim 26 including a pair of spaced springs each having a first end attached to said frame assembly and a second end disposed against said hollow rod spanning said tine array.

28. The device of claim 27 including at least one foot carried by said tine biasing assembly.

29. The device of claim 27 wherein said tine biasing assembly carries a pair of spaced feet.

* * * * *